United States Patent [19]

Springer et al.

[11] E Re. 30,500

[45] Reissued Feb. 3, 1981

[54] MASSAGE DEVICE

[75] Inventors: William E. Springer, Bridgeport; John P. Tuohy, Darien, both of Conn.; Henry J. Walter, Dunedin, Fla.

[73] Assignee: Clairol Incorporated, New York, N.Y.

[21] Appl. No.: 934,730

[22] Filed: Aug. 18, 1978

Related U.S. Patent Documents

Reissue of:

[64] Patent No.: 3,994,290
Issued: Nov. 30, 1976
Appl. No.: 617,485
Filed: Sep. 29, 1975

[51] Int. Cl.[3] ..... A61H 15/00

[52] U.S. Cl. ..... 128/57; 128/65

[58] Field of Search ..... 128/56, 57, 24.2, 24.3, 128/65

[56] References Cited

U.S. PATENT DOCUMENTS

| | | | |
|---|---|---|---|
| 676,604 | 6/1901 | Fritze | 128/57 |
| 861,610 | 7/1907 | Sarver | 128/56 |
| 954,083 | 4/1910 | Gay | 128/24.5 |
| 1,089,683 | 3/1914 | Stapler | 128/57 |
| 1,557,417 | 10/1925 | Cheney | 128/57 |
| 1,594,636 | 8/1926 | Smith | 128/65 |
| 1,777,151 | 9/1930 | Ruttger-Pelli | 128/56 |
| 1,889,487 | 11/1932 | Nachies | 128/41 |
| 1,899,208 | 2/1933 | Murphy | 128/57 |
| 1,899,770 | 2/1933 | Oppenheimer | 128/65 |
| 1,914,290 | 6/1933 | Hopkin | 128/65 |
| 1,947,042 | 2/1934 | Glennan | 128/57 |
| 2,034,758 | 3/1936 | Hicke | 128/56 |
| 2,043,114 | 6/1936 | Ruttger-Pelli | 128/56 |
| 2,043,144 | 6/1936 | Argauer | 81/3.1 |
| 2,103,261 | 12/1937 | Hughes | 128/65 |
| 2,261,385 | 11/1941 | Kaminsky et al. | 128/65 |
| 2,285,105 | 6/1942 | Bacher | 128/56 |
| 2,369,881 | 2/1945 | Berns et al. | 128/66 |
| 2,480,029 | 8/1949 | Jozsy | 128/24.4 |
| 2,519,740 | 8/1950 | Call | 132/13 |
| 2,706,471 | 4/1955 | Heyman et al. | 123/90 |
| 2,706,474 | 4/1955 | Ackerman | 128/65 |
| 2,709,432 | 5/1955 | Ackerman | 128/67 |
| 2,793,610 | 5/1957 | Smull | 118/259 |
| 2,895,469 | 7/1959 | Regley | 128/57 |
| 2,988,084 | 6/1961 | Douglas | 128/41 |
| 3,733,634 | 5/1973 | Golbe | 15/28 |
| 3,744,634 | 7/1973 | Schlenz | 210/151 |
| 3,754,548 | 8/1973 | McGrath | 128/65 |
| 3,818,904 | 6/1974 | Kawada | 128/56 |
| 3,867,928 | 2/1975 | Tupper | 128/24.1 |
| 3,874,373 | 4/1975 | Sobel | 128/49 |

FOREIGN PATENT DOCUMENTS

| | | | |
|---|---|---|---|
| 1817184 | 8/1960 | Fed. Rep. of Germany | 128/57 |
| 2238563 | 9/1973 | Fed. Rep. of Germany | 128/56 |
| 1270620 | 7/1961 | France | 128/66 |
| 618413 | 3/1961 | Italy | 128/57 |
| 208970 | 1/1924 | United Kingdom | 128/57 |
| 328532 | 5/1930 | United Kingdom | 128/56 |

*Primary Examiner*—John D. Yasko
*Attorney, Agent, or Firm*—Gerald S. Rosen; George A. Mentis

[57] ABSTRACT

A massage device includes a rotatable housing containing a plurality of projecting spheres for engaging the skin and kneading the tissues therebeneath. The housing has a cavity therein for storing massaging fluid or lotion which is dispensed over and by the spheres. The massage device may either be permanently or removably attached to a rotary drive unit or may be in combination with a fluid metering means contained in a rotary drive means.

17 Claims, 5 Drawing Figures

MASSAGE DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to massage devices and more particularly, this invention relates to massage devices which utilize rotating spheres and dispense massage lotion.

2. Technical Considerations and Prior Art

Mositurizing preparations in the form of lotions and creams are widely used to add moisture to the hydrophilic outmost layer of the skin, as well as to prevent the evaporation of moisture from the skin.

Cosmetic experts recommend toning and moisturizing as a regime to keep facial skin supple and pliable, and to counteract the formation of wrinkles associated with dehydration and aging.

Massaging is widely practiced to tone facial muscles to which the skin is attached. Gentle pressure causes a reaction in the tissues that increases blood supply to the treated area, which in turn supports metabolic activity. Hand massaging is usually done by slow circular stroking along the major facial muscles.

There are oscillating mechanical massaging devices, however, using these devices for facial massages is generally not satisfactory, because they usually produce only short vibratory strokes at high frequencies, which do not allow sufficient time for the muscle tissue to react.

The prior art also includes massaging devices which utilize rotating spheres, which revolve around a central axis. However, these devices include no structure for dispensing massaging lotions and are not really suitable for facial massages. Examples of this type of massaging device are disclosed in U.S. Pat. Nos. 1,557,417; 1,777,151; 1,899,208 and [2,043,144] *2,043,114.*

It is also known to equip massage devices with spheres in order to apply fluid. This concept is shown in U.S. Pat. Nos. 2,103,261; 2,285,105; [2,706,471] *2,706,474;* 2,895,469; 2,988,084 and 3,754,548. In these patents, the spheres are not mechanically driven while dispensing the fluid. Rather the motion imparted to the spheres is derived by manually manipulating the device instead of by a combination of manually manipulating the device, while the spheres are mechanically driven to revolve, roll and rotate.

The prior art does not teach the concept of a massaging device, which is especially suitable for facial massages and uses a combination of mechanically driven rotating spheres, which dispense a massaging or treating lotion as they are driven.

OBJECTS OF THE INVENTION

In view of the afore-described deficiencies of the prior art, it is an object of this invention to provide a new and improved massaging device.

It is an additional object of the instant invention to provide a new and improved massaging device, which is especially suited for facial massages.

It is still another object of the instant invention to provide a new and improved massaging device, which drives a plurality of spheres to roll over the skin while performing a massage.

It is still another object of the instant invention to provide a new and improved device, which dispenses liquid over driven spheres while in operation.

It is an additional object of the instant invention to provide a new and improved massaging device, which is readily coupled to existing motor drives, similar to that disclosed in the U.S. Pat. No. 3,733,634.

It is an additional object of the instant invention to provide a new and improved massaging device wherein the massaging device utilizes revolving and rotating spheres and dispenses massaging fluid, and wherein the device is combined with a motor and fluid metering device in a single unit.

SUMMARY OF THE INVENTION

In view of the aforementioned and other objects, the instant invention contemplates a massage device including a housing which is disposed to rotate about an axis. Means are included for transmitting rotary motion to the housing and a cavity is included within the housing for containing fluid. The housing has a plurality of openings circumferentially disposed in one end, through which project spheres which perform a massage when driven. A passage communicates with the housing, so that fluid may be injected into the housing for application by the spheres.

DETAILED DESCRIPTION

Figure 1:
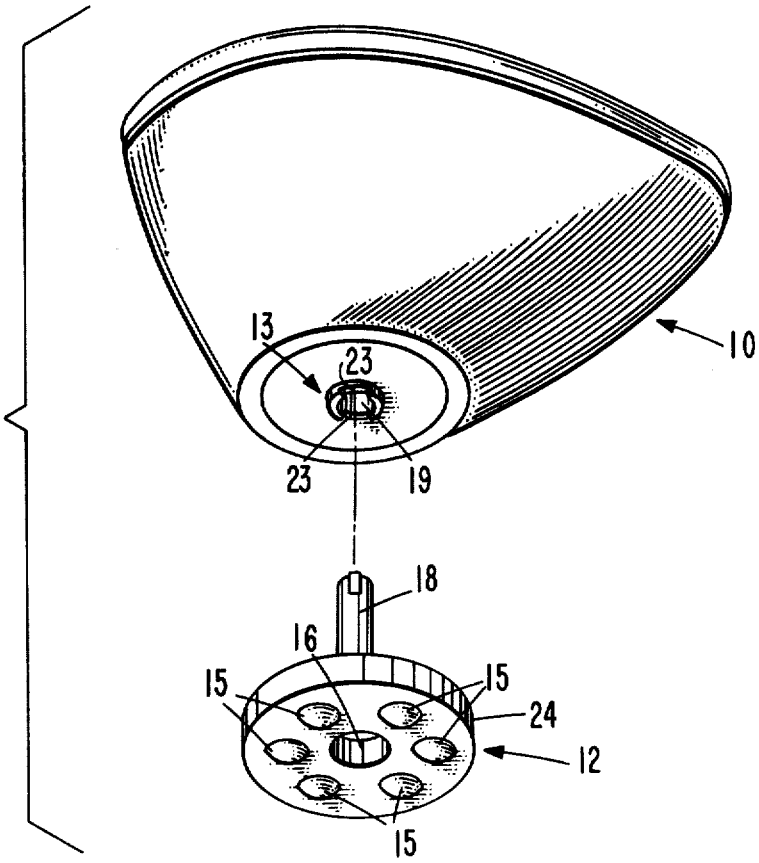
FIG. 1 is an exploded view in prospective showing a massage device according to the instant invention, in combination with a drive unit which is similar to that disclosed in U.S. Pat. No. 3,733,634.

Referring now to FIG. 1, there is shown a drive unit 10 which may have any convenient configuration. Preferably, the drive unit 10 is similar to that disclosed in U.S. Pat. No. [3,744,634] *3,733,634*, and contains a motor (not shown) and battery pack (not shown). A massage device, generally designated by the numeral 12, is coupled to the drive unit 10 for rotation by the drive unit with a coupling, generally designated by the numeral 13. The massage unit 12 includes a plurality of massaging spheres 15 for engaging the skin and kneading the muscles, which support the skin. Preferably when energized, the drive unit 10 rotates the massage unit 12 at a relatively low speed, in the range of one to ten revolution per second. In this particular embodiment, the lotion or other fluid dispensed by the massage unit 12 is injected into the massage unit through a passage 16 axially disposed in the massage unit.

Figure 2:
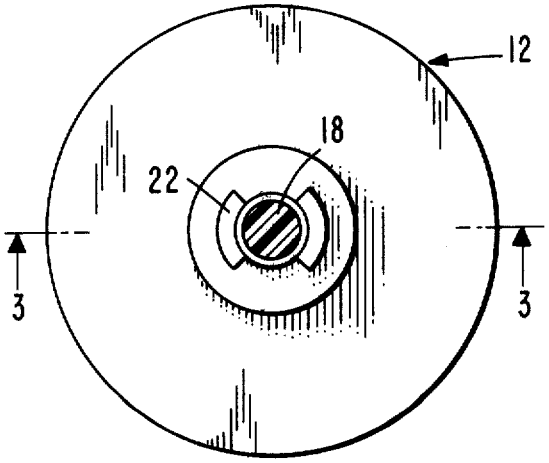
FIG. 2 is a top view of the massage device shown in FIG. 1.
Figure 3:
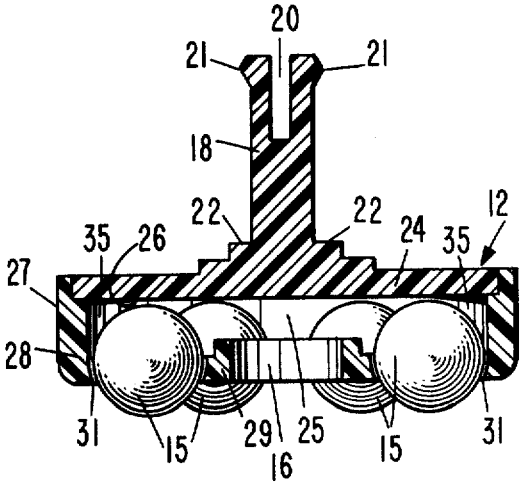
FIG. 3 is a sectional view, taken along lines 3—3 of FIG. 2, showing the construction of the massage device of FIG. 1.
Figure 4:
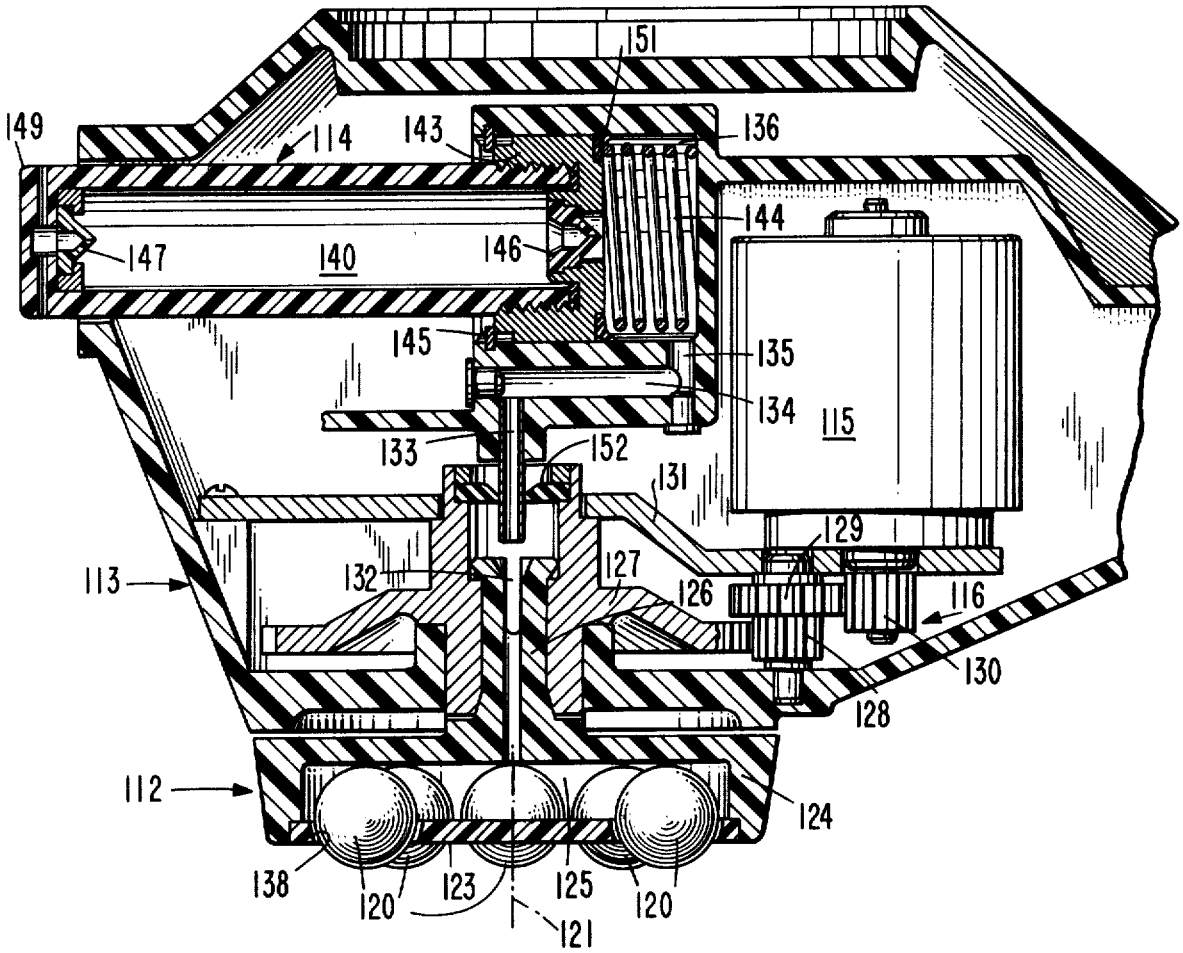
FIG. 4 is a sectional view of another embodiment of the instant invention, showing a massage unit in combination with a lotion metering and drive unit.

Referring now to FIGS. 2 and 3, in combination with FIG. 1, it is seen that the massage unit 12 has a stem 18 projecting therefrom, which is received in a bore 19 within the coupling element 13 of the drive unit 10. The massage unit is held into the drive unit as illustrated in FIG. 4. The stem 18 has a slot 20 formed in one end, and a pair of projections 21 radially extending adjacent to the slot so that the stem will frictionally engage the bore 19, and thereby hold the massage unit 12 mounted into the drive unit 10. A pair of radial projections 22 register with recesses 23 (FIG. 1) in the coupling element 13, so that the coupling element 13 will positively drive massage unit 12. When it is desired to remove the massage unit 12 from the drive unit 10, the massage unit is simply pulled with sufficient force to overcome friction between the projections 21 and the interior surface of the bore 19.

Referring specifically to FIG. 3, it is seen that the massage unit 12 defines a circular housing 24 having a cavity 25 therein, which is defined by a back wall 26, which cooperates with an annular flange 27. The annular flange 27 has a side rim 28 and a bottom wall 29. The bottom wall 29 has a plurality of openings 31 therein, each of which retains a sphere 15. The openings 31 may taper inwardly and have a minimum diameter, which is less than the maximum diameter of the spheres, so that the spheres will not fall through the openings. The openings 31 may be equally spaced around the axis of the housing 24.

As seen in FIG. 3, the passage 16 registers with the cavity 25, so that fluid may be dispensed or injected through the passage 16 for distribution by the spheres 15. The passage 16 has an annular lip 33 therearound, which helps retain the fluid in the cavity 25.

If the material is in the form of a relatively viscous fluid, such as a cream which will not readily run out of the passage 16, then it may be dispensed into the chamber 25, while the chamber is in any orientation. However, if the fluid is relatively nonviscous and flows relatively freely, then the unit is tilted vertically and the fluid poured through the passage 16. Upon rotating the unit, the fluid will flow by centrifugal force along the back wall 26, and into a space 35 behind the spheres 15. The centrifugal force acting on the spheres 15 and the fluid will tend to force the spheres against the openings 31, sealing them and keeping the fluid within the cavity 25. When the spheres 15 are brought into contact with the skin, the spheres will begin to rotate as they revolve and carry the fluid from the space 35 onto the skin of the user, while massaging the tissues and muscles below the skin.

Figure 5:
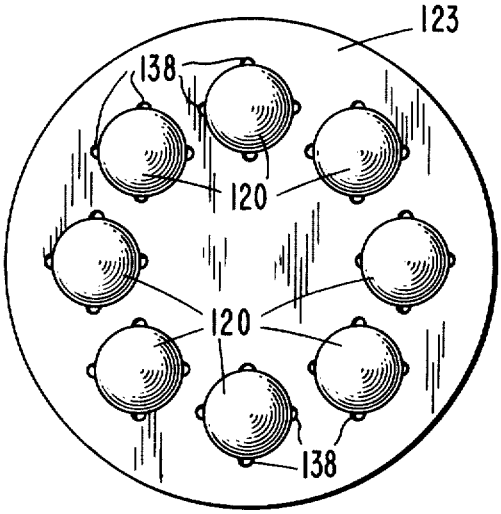
FIG. 5 is an end view of the massage device of FIG. 4.

Referring now to FIGS. 4 and 5, there is shown a second embodiment of the instant invention, wherein a massaging unit or device, generally designated by the numeral 112, is removably attached to the drive means, which is contained within a housing, generally designated by the numeral 113. In this embodiment, the drive is obtained from an electric motor 115, which rotates the massaging device 112 through a gear train, generally designated by the numeral 116. A fluid dispensing and metering unit 114 is also contained within the housing 113.

As with the embodiment of FIGS. 1 through 3, the massage unit 112 has a plurality of spheres 120 mounted therein circumferentially about an axis 121. The spheres 120 project through openings or recesses 122 disposed in an end plate 123. The end plate 123 cooperates with a housing 124 to form a cavity 125 which, as will be explained hereinafter, contains the massaging lotion.

The massaging device 112 is connected by a drive shaft 126 to a gear 127. The gear 127 is driven by a gear 128 that is coaxially mounted with a gear 129, which is meshed with a gear 130 and driven by the motor 115. The gears are mounted in a mounting support within the housing itself. The motor 115 may be energized either by batteries or by a cord connecting the motor to house current. As the motor 115 drives the unit 112, the unit will rotate about the axis 121 and when the spheres 120 are in contact with a surface, such as the skin, they will roll or rotate.

The massaging fluid or lotion is dispensed into the cavity 125 through a bore 132 in the drive shaft 126. The bore 132 is aligned with a tube 133, that is in turn registered with a passageway 134, having a right angle bend 135 therein. The right angle bend 135 communicates with a chamber 136, in which the fluid is stored. The fluid is then able to flow from the chamber 136 through the right angle bend 135, the passage 134, the tube 133, the bore 132 and into the cavity 125. From the cavity 125, the fluid is dispensed by the rolling spheres 120 onto the face. In order to facilitate dispensing the fluid, the openings 122, which retain the spheres 120 in place may have slots 138 which register with the cavity 125, or may be constructed as shown in FIG. 1.

The metering unit 114 includes a reservoir 140, which is charged with massaging fluid. The reservoir 140 has threads about one end thereof and is screwed into a piston 143, which is slidably received in a chamber 136. The piston 143 is biased to the left by a spring 144, which pushes it against a retaining ring 145. To fill the reservoir 140, the reservoir is unscrewed from the piston 143, filled with fluid and then screwed back into the piston 143. The piston 143 has a one-way duck bill valve 146 disposed therethrough, which communicates between the reservoir 140 and chamber 136. The reservoir 140 also has a duck bill valve 147 at its opposite end, which opens to the atmosphere. A button portion 149 formed by the second end of the reservoir 140 projects out of the housing 113.

In operation, the projecting portion 149 is depressed to push the reservoir against the bias of the spring 144 engaged by the piston 143. This forces air and fluid out of the chamber 136 and through the passage 134 and the tube 133. The spring 144 then returns the piston 143 to its original position where it seats against the retaining washer 145. This causes a partial vacuum in the chamber 136 due to the restricted area of the passageways 133 and 134 and the tube 133 that restricts the flow of fluid back into the chamber. Valve 146 then opens to let fluid flow into the chamber 136, while the valve 147 opens and lets air into the reservoir 140. Upon again passing the projecting portion 149 of the reservoir 140, the fluid or lotion in chamber 136 is pushed to flow into the cavity 125 as described above. A sliding seal 151 is disposed between the piston 143 and the inner wall of chamber 136, and a rotating seal 152 engages the tube 133, so that all of the moving parts are effectively sealed.

In operation, the massaging units 12 and 112 of the first and second embodiments respectively, are manually moved as the spheres 15 and 120 are driven to revolve around a central axis and are rolled over the skin. A compound motion which enhances the massaging action is thus achieved.

The spheres 15 and 120 may be resilient so as to flex during the massage or may be stiff, so as not to flex. In addition, the spheres may have a smooth surface or a texturized surface, and may be resiliently mounted, so as to readily conform the irregularity of user's face.

The afore-described embodiments are merely illustrative of the invention, which is to be limited only by the following appended claims.

What is claimed is:

1. A massage device comprising:

a housing disposed about a rotational axis;

means for transmitting rotary motion to the housing to rotate the housing about the axis;

a circular cavity within the housing for containing a fluid;

a plurality of openings circumferentially disposed in one end of the housing, wherein said openings register with said cavity;

a sphere disposed in each of said openings, wherein the spheres each have a diameter greater than the smallest diameter of the openings, [the] *and* project through the openings for rotation relative to the housing as the housing rotates; and a passage into said housing communicating with said cavity, wherein said passage is aligned with the axis of said housing and provides for introduction of said fluid into said cavity and onto said spheres for distribution thereby.

2. The massage device of claim 1, wherein the means for transmitting rotary motion to the housing is a coupling for detachably connecting the [massage device] *housing* to a motor.

3. The massage device of claim 2, wherein the passage opens on a side of the [house] *housing* opposite the coupling.

4. The massage device of claim 3, wherein the passage includes an annular lip, which extends into the cavity to help prevent the fluid from flowing out of the cavity.

5. The massage device of claim 1, further including a drive unit and fluid dispensing unit, wherein the drive unit is coupled to the rotary motion transmitting means and the passage extends through the rotary motion transmitting means and registers with the fluid dispensing unit.

6. The massage device of claim 5, wherein the fluid dispensing unit includes metering means for dispensing metered amounts of fluid into a chamber which registers with said passage.

7. The massage device of claim 6, wherein the metering means includes:

a reservoir for storing the fluid, said reservoir having first and second ends, the first end of which is slidably received in said chamber;

first one-way valve means communicating between the reservoir and chamber for allowing fluid to flow from the reservoir into the chamber, but not from the chamber to the reservoir;

second one-way valve means communicating between the reservoir and atmosphere for allowing air to flow into the reservoir but for preventing fluid from flowing out of the reservoir into the atmosphere;

retaining means for holding the reservoir in the chamber;

spring means for urging the reservoir against the holding means; and flow restriction means for preventing fluid from flowing back into the chamber from the passage, so that when the reservoir is pushed into the chamber against the bias of the spring means and then returned against the retaining means by the spring means a partial vacuum is created in the chamber which pulls fluid through the first one-way valve means into the chamber and air through the second one-way valve means into the reservoir, and so that when the reservoir is again pushed, the fluid in the chamber pushes fluid in the passage through the cavity in the massage device housing.

8. The massage device of claim 7, wherein the spring means is disposed within the chamber between the chamber and the first end of the reservoir.

9. The massage device of claim 7, wherein a piston is disposed between the reservoir and chamber and wherein the reservoir is threaded to the piston, so as to be removable therefrom for charging with fluid.

10. The massage device of claim 7, wherein the drive unit and fluid dispensing unit are contained within a housing, and wherein the second end of the reservoir extends through the housing to provide a button, which when depressed meters fluid to the chamber.

*11. A massage device comprising:*

*a housing disposed about a rotational axis;*

*a rotary drive unit;*

*means for transmitting rotary motion from the rotary drive unit to the housing to rotate the housing about said axis;*

*a cavity within the housing disposed about said rotational axis for containing a fluid;*

*a plurality of openings disposed about said rotational axis in the side of the housing opposite to the rotary motion transmitting means, wherein said openings extend into said cavity;*

*a sphere disposed in each of said openings, wherein the spheres each have a diameter greater than the smallest diameter of the openings, and project through the openings for rotation relative to the housing upon manual engagement of said spheres with the skin as the housing is rotated by said rotary drive unit; and*

*a passage into said housing opening on said side of the housing opposite to the rotary motion transmitting means and communicating with said cavity, wherein said passage is aligned with the axis of said housing and provides for introduction of said fluid into said cavity and onto said spheres for distribution thereby.*

*12. The massage device of claim 11, wherein both the housing and the cavity are circular.*

*13. The massage device of claims 11 or 12, wherein the passage includes an annular lip, which extends into the cavity to help prevent the fluid from flowing out of the cavity.*

*14. The massage device of claim 11, wherein the means for transmitting rotary motion to the housing is a coupling for detachably connecting the housing to a motor.*

*15. The massage device of claim 14, wherein the coupling has a bore and the housing has an axially projecting stem, said stem having a slot formed in its end and a pair of projections radially extending adjacent to the slot, so that the stem will frictionally engage said bore.*

*16. The massage device of claim 14, wherein said housing has projections which register with recesses in the coupling for positive drive thereby.*

*17. The massage device of claim 11, wherein said drive unit rotates within the range of one to ten revolutions per second.*

* * * * *